United States Patent [19]

Pitroda et al.

[11] 3,825,683

[45] July 23, 1974

[54] LINE VARIATION COMPENSATION SYSTEM FOR SYNCHRONIZED PCM DIGITAL SWITCHING

[75] Inventors: Satyan G. Pitroda, Villa Park; Bernard J. Rekiere, Addison, both of Ill.

[73] Assignee: GTE Automatic Electric Laboratories Incorporated, Northlake, Ill.

[22] Filed: Nov. 10, 1972

[21] Appl. No.: 305,634

[52] U.S. Cl... 178/69.5 R, 178/69.5 DC, 179/15 BS

[51] Int. Cl. .......... H04l 7/00

[58] Field of Search .......... 178/69.5 R, 69.5 DC; 179/15 BS, 15 AL

[56] References Cited

UNITED STATES PATENTS 3,557,314 1/1971 Avignon .......... 179/15 BS

*Primary Examiner*—Howard W. Britton
*Assistant Examiner*—Marc E. Bookbinder
*Attorney, Agent, or Firm*—Lester N. Arnold

[57] ABSTRACT

A line synchronizer system including a digital phase detector subsystem, a frame detector subsystem and an elastic buffer register store subsystem is used within a digital PCM switching exchange to correct for timing or phase errors caused by cable temperature fluctuations and cumulative phase jitter. The line synchronizer system is utilized to correct for phase deviations of less than one bit position within the phase detector subsystem and provides for a predetermined number of bit position corrections within the elastic buffer register store subsystem. All timing corrections are bidirectional and are made during the framing bit which does not contain real information so hence that there is no loss of real information during a subsequent digital switching process. The line synchronizer system is described in connection with a frequency synchronized digital transmission loop using the master-slave synchronization method.

11 Claims, 15 Drawing Figures

LINE VARIATION COMPENSATION SYSTEM FOR SYNCHRONIZED PCM DIGITAL SWITCHING

BACKGROUND

This invention relates generally to a synchronized PCM TDM digital switching exchange, and more particularly, relates to the correcting of certain line variations resulting from temperature changes and phase jitter which affect adversely interoffice synchronization.

In the fast-developing art of digital information transmission and switching as currently being applied to telephone communication systems, digital PCM tandem switching exchanges are being developed for switching the digital information of a number of incoming PCM carrier systems to available free channels of outgoing PCM transmission systems. PCM TDM digital information transmission is now well developed and commercially available in the T-carrier format, but digital switching per se without the need to convert to analog information, switch through crosspoint matrices and reconvert to digital information is of more current development. It is now recognized that as a requisite to successful time switching, i.e., minimum loss of information through switching, of pulse coded time division multiplexed digital data trains, a given digital switching exchange must have recognition of the incoming channels and frames in order to avoid loss of transmitted information during the switching operation through misinterpretation of incoming information.

Much has been written on the need for and the manner of accomplishing time synchronization in PCM networks through the use of some common timing signals. There are several known methods of providing PCM network synchronization, i.e., the master-slave synchronization method, mutual synchronization method and the asynchronous method, of which the master-slave synchronization method enjoys some current popularity. Fundamentally, the master-slave synchronization method provides the slaving of all reference timing of an interoffice transmission loop to the timing provided by the clock oscillator of the master digital switching exchange. Multiplexed digital information is transmitted from a master station through a plurality of intermediate stations (repeaters) to a receiving (slave) station and then returned to the master station or exchange by an interoffice transmission loop. Such transmission loops are said to be frequency synchronized when the frequencies of the clock oscillators of the distant tandem exchanges are all slaved to the clock oscillator frequency of the master exchange. Moreover, as a particular type of frequency synchronization, when the transmission loop delay is equal to an integral multiple of the frame period, the synchronization is said to be frame synchronized. It is generally understood that frame synchronization is required in order to minimize the storage required by input data buffer equipment used in the master exchange.

The use of the master-slave synchronization method to provide frequency synchronization eliminates the requirement for additional buffer storage means to compensate for frequency variations other than line variations which would be required if say the asynchronous method were utilized. It should be said that with existing state-of-the-art D1 or D2 channel bank equipment as used in the distant-end transmitting offices, the stability of the clock oscillators does not appear to be sufficient to permit successful use of the asynchronous method.

Frame synchronizing circuits provide a time delay through the use of buffer stores for the received T-carrier information and it is desired for the phase locked transmission loops terminating at the master exchange to send and receive all same-number channels within a frame period at the same time. However, the time position (phase) of the incoming pulse data trains are subjected to fluctuations due to variations in the propagation conditions arising from cable temperature fluctuations, lengths of particular transmission loops and desynchronization caused by phase jitter. These phenomena are commonly referred to hereinafter as line variations. The temperature variable is a transmission phenomenon wherein the velocity of propagation along typical cables is a function of the cable temperature and the loop length. Phase jitter resulting from line repeater stations is a quick fluctuation as compared to the relatively slow temperature related change and has various causes such as crosstalk between transmission lines, the induction effect of parasitic periodical signals, the interactions between the signals transmitted successively when the transmission medium introduces amplitude and a plurality of phase distortions, etc. The amplitude of the phase jitter is cumulative with repeater stations and hence increases in relation to the length of the transmission line.

As calculated for the T1-carrier type transmission of 24-channels using 8-digit PCM coding propagated at a bit rate of approximately 1.544 megabits per second and having a frame period of some 125 μs, the phase delay variation due to temperature change is of the order of 4.0 nonoseconds (ns) per mile per °C temperature change, while typical jitter variation is of the order of 9.0 ns per repeater stage. It is desired therefore that line synchronizer equipment be located in the master exchange at the end of the loop length for use in compensating for line perturbations through providing phase detection, frame detection and buffer storage capability including the capability to provide time-slot changing of the digital information. Further, it is desired that such line synchronizer equipment continuously track the phase variations and hence must be required to operate at the speed with which such variations occur. This condition is best fulfilled through the employment of digital circuitry.

One earlier attempt to utilize the principle of providing time delay in order to compensate for line variations appears in an article entitled "Magnetic Ultrasonic Delay Lines for a PCM Communication System" published in the September, 1960 issue of IRE Transactions on Electronic Computers, wherein there is disclosed a servo-operated delay-line pad and a temperature-compensated delay-line memory, both magnetostrictively driven at some 1.5 MHz. It is said that the delay-line pad automatically compensates for external delay changes as small as plus or minus 8 ns at a rate of 75 ns per second. While this speed of operation is adequate, the circuitry disclosed is cumbersome from the point of view of utilizing some analog circuitry and electromechanical devices. It is more desirable to provide all digital circuitry and preferably integrated circuitry wherein line variations are corrected, and more particularly, when the master-slave synchronization method is already providing for frequency synchronization of the incoming data train, to provide line synchronizing equipment for compensating primarily for line variations.

SUMMARY

It is therefore an object of the present invention to provide for use with a digital PCM transmission and switching communication network, a line synchronizer system that will correct for timing deviations caused by line propagation variables while over-all frequency synchronization is provided for through use of the master-slave synchronization method.

It is another object of the invention to provide a digital phase detector subsystem to correct for those phase deviations of less than a selected magnitude, and to provide an elastic buffer register store subsystem to correct for those phase deviations equal to or greater than such selected magnitude.

It is still another object of the invention to provide three-bit input shift register means within the phase detector subsystem that will compensate for time delays of up to one complete time slot (bit) for the incoming PCM information.

It is a further object of the present invention to provide a frame detector subsystem for recognizing a standard framing pattern and responding to either a detected out-of-frame condition or a coarse-change instruction from the phase detector subsystem to shift time-slots in a positive or negative direction to regain in-frame condition.

Still a further object is to provide an elastic buffer register store having a plurality of time delay means, each means thereof providing a time delay of essentially one bit position and providing sequential cumulative time delay occurrences, and including a means for selecting the magnitude of time delay required to correct the detected magnitude of phase deviation.

A line synchronizer system for use in a master digital PCM switching exchange includes a digital phase detector subsystem, a frame detector subsystem, and an elastic buffer register store subsystem. The phase detector subsystem receives the incoming PCM carrier information into a shift register which will provide phase correction in equal increments of 90° up to a maximum phase deviation of one time slot or 360°. The phase detector utilizes phase detector logic circuitry to compare the incoming carrier information to an exchange clock reference timing in order to determine phase deviations to the right (positive phase direction) or the left (negative phase deviations). A phase control counter in the form of an up-down counter is caused to count up or count down by corresponding outputs from the phase detector logic and when four like counts are accumulated, a coarse change output having the direction of the count given by a positive or negative polarity is outputted to the frame detector subsystem. The frame detector subsystem includes logic-to-select circuitry for determining frame search time, an out-of-frame detector for comparing phase aligned information from the phase detector subsystem with the exchange reference framing source for generating an error signal when an out-of-frame condition exists, an out-of-frame condition detector circuit for detecting the error signal and instructing a frame detector counter in the form of an up-down counter to advance or reduce its count by one. Eight decoded outputs from the frame counter are outputted to eight separate bit stores (cells) of an eight-bit shift register of the elastic buffer register with PCM carrier information being gated into the shift register at a particular bit store determined by the count of the frame counter. The PCM carrier information is progressed through a predetermined number of the eight available bit stores of the shift register whereby the amount of time delay to be introduced for phase variable correction is controlled.

THE DRAWING

DETAILED DESCRIPTION

Figure 1:
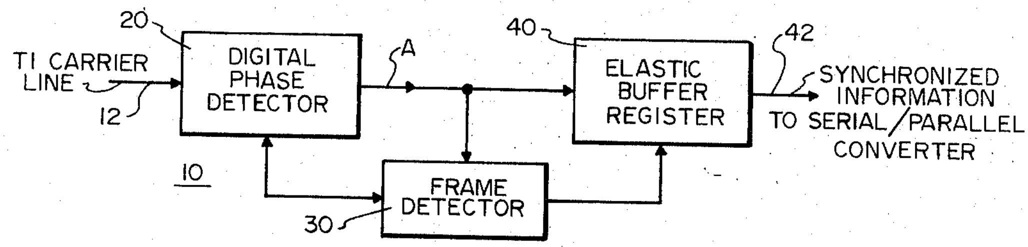
FIG. 1 is a functional block diagram of a line synchronizer system showing three major subsystems comprising the same, namely, digital phase detector, frame detector and elastic buffer register subsystems.

There is shown in FIG. 1 a line synchronizer system 10 which receives a digital unipolar input pulse data train 12 arranged in the T1 carrier format, which system 10 is operative to detect the phase deviation of the frame synchronized pulse train due to the phenomena known as line variations resulting from so-called cable temperature changes and phase jitter. The line synchronizer system 10 is comprised of three separate equipment subsystems conveniently identified by the functions which they are to perform, namely, a digital phase detector subsystem 20, a frame detector subsystem 30 and an elastic buffer register store subsystem 40. An output pulse data train 42 from this latter subsystem is provided as fully frame synchronized information independent of the line variations to other processing equipment such as a serial/parallel converter (not shown) wherein the serially arranged pulse train is converted to parallel format commensurate with a common control digital switching matrix structured to handle only parallel information supermultiplexed from eight different T1 carrier trunks.

As previously stated, the transmission loop is frame synchronized through an application of master-slave synchronization and hence, the input pulse data train 12 absent any line variations would be presented to the serial/parallel converter with an overall loop delay equal to an integral multiple of the frame period. However, it is important to note at the outset of this disclosure that the principles of this invention apply in particular to the correction of line variation phenomena and could be utilized as well in conjunction with other methods of obtaining frequency synchronization including the asynchronous method. Since line variations do occur and therefore, must be compensated for prior to any supermultiplexing operation, the overall function of the line synchronizer system 10 as disclosed herein is to compensate for any such line variations so as to continuously maintain the overall loop delay equal to an integral multiple of the frame period. To this end, the line synchronizer system 10 applies the phase detector subsystem 20 to continuously track phase (line) variations and store those line variations which are less than one bit, uses the frame detector subsystem 30 to scan the recieved digital input data through a frame search window (FSW) for a known standard framing pattern and utilizes the elastic buffer register subsystem 40 to provide the necessary time delay (integral multiple of bit periods) to regain full frame synchronization. For the convenience of illustrating the operation of the line synchronizer subsystem 10, it is assumed that the maximum line variation for a typical transmission loop which is frame synchronized will be no more than 8 pulse (time slot) positions or approximately 5.2 μsec. However, it must be said that the line synchronizer system 10 could be made to adjust for larger degrees of line variation, if desired. Further, the line variations are herein categorized as fine line variations, i.e., phase deviations of less than one pulse position (zero to 360°) which are compensated for by the phase detector and coarse line variations, i.e., phase deviations of one or more pulse positions compensated for by the elastic buffer store 40.

Figure 2:
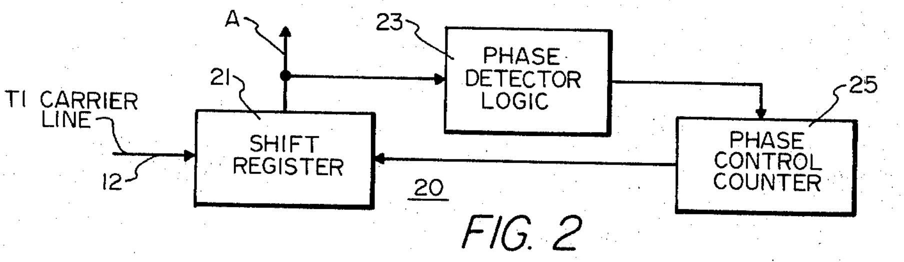
FIG. 2 is a functional block diagram of the digital phase detector subsystem.

The phase detector subsystem 20, the block diagram of which is shown in FIG. 2, is provided to compensate for the fine line variations in addition to detecting the alignment of the incoming phase of the input digital pulse train 12. The phase detector is provided with a delay element in the form of a shift register unit 21 which includes a normal delay of approximately 360° or one pulse position. When a phase deviation of less than 360° but more than 90° occurs, it is detected by phase detector logic circuitry 23 which informs a phase control counter 25 (up/down counter). The phase control counter 25 changes the output data tap on the shift register 21 and the amount of the detected phase deviation in 90° increments is replaced through reducing the imposed time delay. If the time delay accumulates in the same positive or negative direction for a full 360°, the frame detector 30 is informed so that it can shift the frame search window (FSW) by one time slot in a corresponding positive or negative direction and the elastic buffer register 40 is inputted so that a single tap on its eight tap position delay line can be altered in the same corresponding direction to compensate for a coarse variation. Any needed phase alignment is done only during the framing time slot (the 193rd bit position which does not contain real information data) so that real information is not lost or false information originated. The phase variations are accumulated during a given frame period, thus, the phase alignment information from a phase detector subsystem 20 remains constant during a given frame period.

Figure 3:
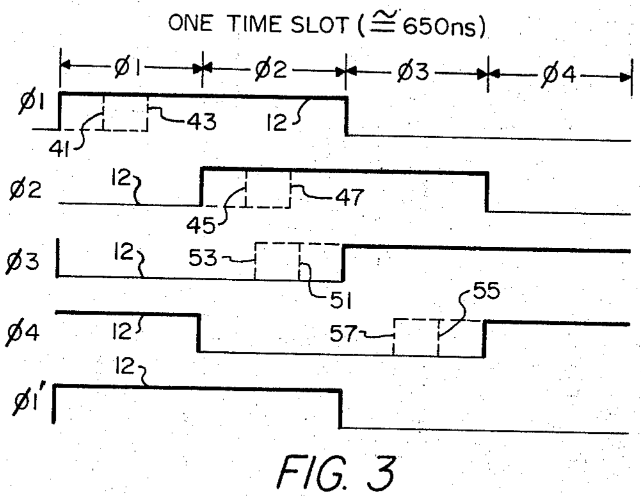
FIG. 3 is a graphical representation with respect to time of 90° phase regions $\phi 1$–$\phi 4$ of a shift register for the digital phase detector subsystem of FIG. 2.

FIG. 3 is a graphical illustration for phase variations of less than one time slot or approximately 650 ns. A 360° phase variation is conveniently divided into four 90° time quadrants of $\phi 1$, $\phi 2$, $\phi 3$ and $\phi 4$. The solid-line curves shown at $\phi 1$, $\phi 2$, $\phi 3$ and $\phi 4$ demonstrate the phase alignment of the input data train 12 when there is no phase delay, and exactly 90°, 180° and 270° phase delay, respectively. The solid-line curve shown at $\phi 1$, illustrates a full bit position displacement of 360° phase delay. The dashed-line curves 41 and 43 and 45 and 47 of the $\phi 1$ and $\phi 2$ curves, respectively, demonstrate further positive phase deviations within the phase regions $\phi 1$ and $\phi 2$. The dashed-line curves 51 and 53 and 55 and 57 of the $\phi 3$ and $\phi 4$ curves, respectively, demonstrate negative phase deviations within the phase regions $\phi 2$ and $\phi 3$. Once recognition of a phase deviation of less than 90° has occurred within a given time frame, further deviations within that particular phase region are ignored. If four time frames occur in which there is recognition of a phase deviation of the same direction, positive or negative, the phase shift is compensated for by changing the output data tap on the shift register 21.

Figure 4:
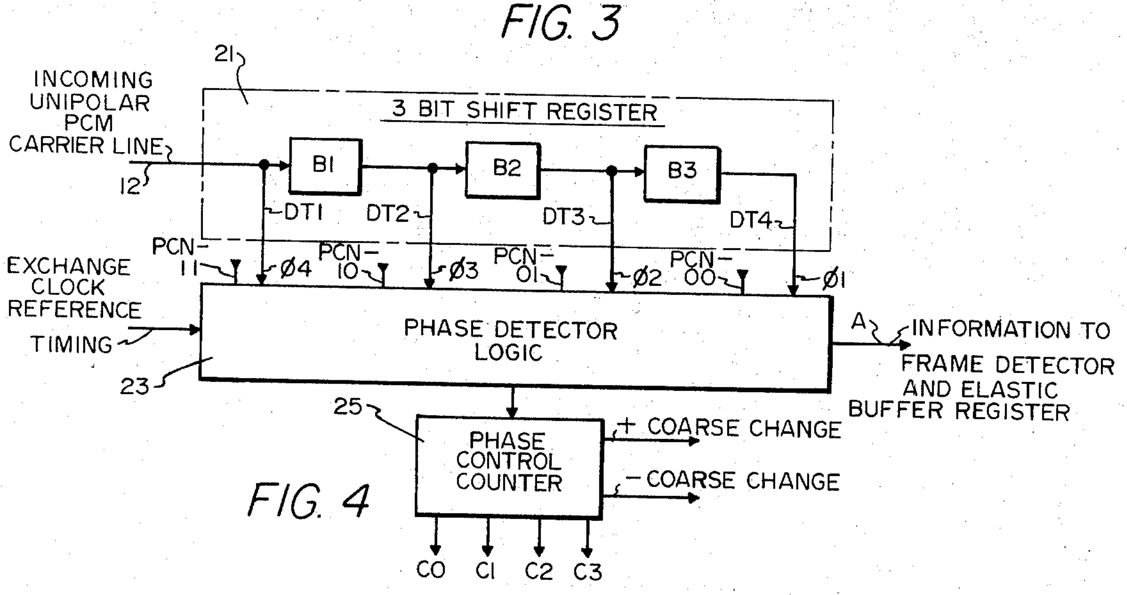
FIG. 4 is another block diagram of the digital phase detector subsystem presented in slightly more detail than the block diagram of FIG. 2.
Figures 5, 5A, 5B:
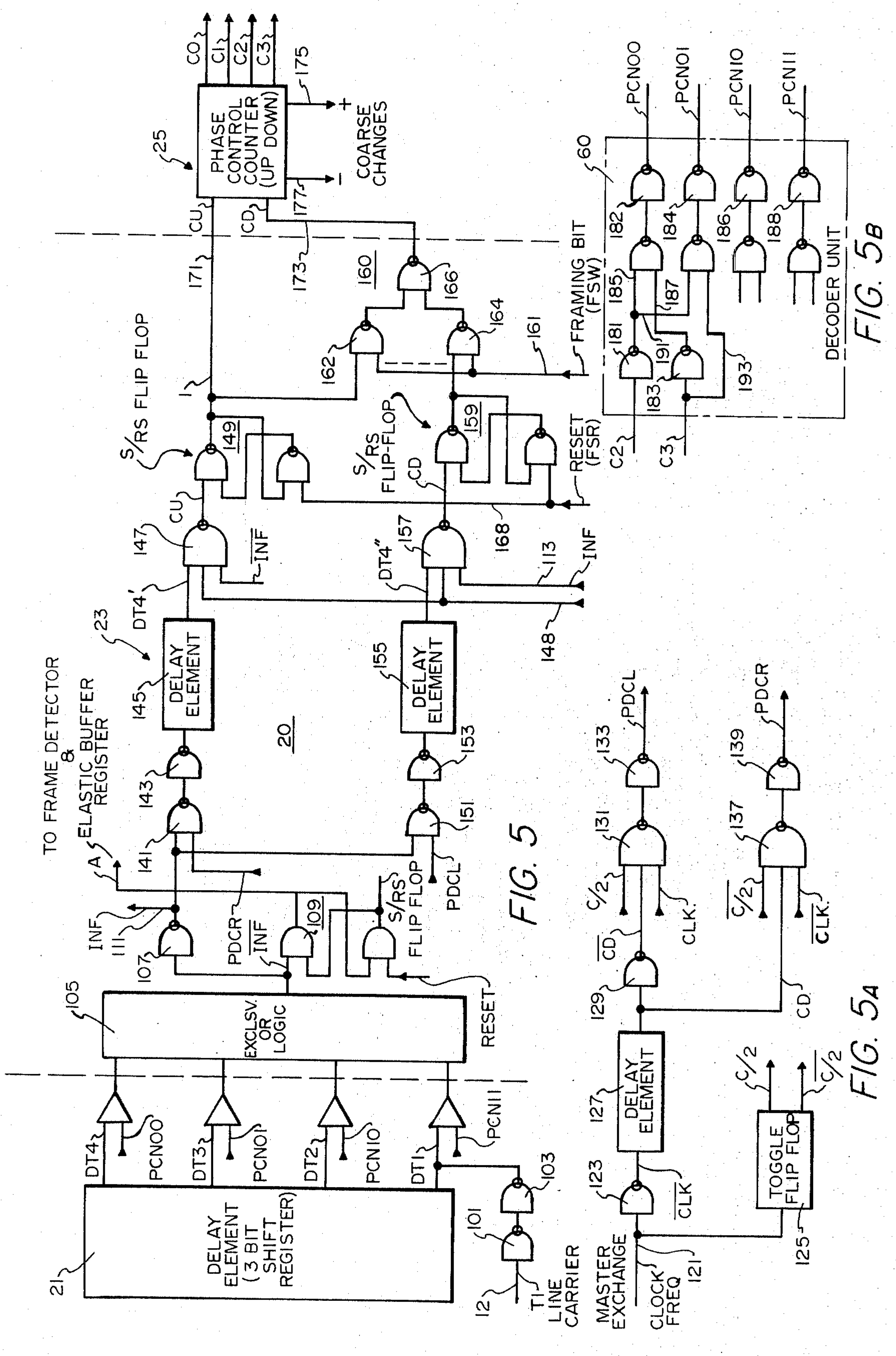
FIG. 5 is a detailed logic diagram of a major portion of the digital phase detector subsystem.
FIG. 5A–5B are logic diagrams showing the development of certain input signals provided to the logic of FIG. 5.

Now referring to FIGS. 4 and 5, the shift register 21 receives the T1 carrier input pulse data train 12 after the normal bipolar digital information has been converted to unipolar format for convenience of processing. The shift register 21 includes a three bit register store shown at B1, B2 and B3 and is provided with four data output taps DT1–DT4 taken before the bit store B1 and after each of the bit stores B1–B3, respectively. Each of the bit stores B1–B3 produce a 90° phase shift (time delay), i.e., there is no time delay at DT1 and the input PCM information 12 is delayed by 90°, 180° or 270° at the data taps DT2–DT4, respectively. In accordance with the principles of the present invention, the input information from data tap DT4 is normally presented to the phase detector logic circuitry 23 and hence to the frame detector 30 and the elastic buffer register 40 as shown at A. The input pulse information taken from data tap DT4 is graphically represented by the phase $\phi 1$ curve and any positive delay of less than 90° magnitude, e.g., curves 41 and 43, would occur within the $\phi 1$ region and thus be ignored.

As stated previously, when the positive phase delay accumulates so that the information pulse occurs within the $\phi 2$ region, the input PCM information is taken from data tap DT3 instead. It is apparent that the accumulated positive delay due to line variations is then corrected by introducing an offsetting phase shift. The positive phase shift has been greater than 90° but less than 180° and the phase delay introduced by the 3-bit shift register 21 has been lessened (advanced) by 90° phase shift. Similarly, when a positive accumulation of phase shift has again advanced the data input pusle train 12 into the φ3 region or the φ4 region, the input pulse train 12 is read from the shift register 21 on data taps DT2 and DT1, respectively. Each time the phase detector logic 23 detects a shift into a different phase region, the phase control counter 25 is caused to count up CU (positive direction) or count down CD (negative direction). The phase counter 25 includes a four step counter of which two steps are representative of the most significant bits and are decoded by the decoder circuit represented in FIG. 5B. When phase shifts have accumulated in a common positive or negative direction to be equal to or greater than 360° (one time slot), the phase counter 25 gives an output known as a coarse change to the frame detector 30 and the elastic buffer register 40 whereby the accumulated phase shift is compensated for. Thus, the phase detector subsystem 20, through the use of the 3Bit shift register 21 and its variable data taps DT1–DT4, compensates for fine line variations and provides recognition of the occurrence of a coarse line variation.

FIG. 5 shows the phase detector subsystem 20 wherein the 3-bit shift register 21 receives the T1 carrier input pulse train 12 at its zero phase shift data tap DT1. The data pulse train 12 is inverted twice by the logic inverter circuits 101 and 103 in order to rebuild the data train. As shown, the data taps DT1–DT4 supply information to a standard type exclusive OR logic gate 105 which in turn provides the information in an inverted format and referred to herein as $\overline{\text{INF}}$, to another logic inverter gate 107 and also to a set-reset S/RS flip-flop circuit 109. The output of the S/RS flip-flop 109 is provided to the frame detector 30 and the elastic buffer register 40 as shown at A in FIG. 4. The PCM information INF from the logic gate 107 is further processed by comparison with exchange clock reference signals, and also taken from lead 111 to lead 113 for use with another logic circuit. When any one of four separate clock reference signals PCN00, PCN01, PCN10 and PCN11 is true, a corresponding one of the four data taps DT4, DT3, DT2 and DT1, respectively, is used as the output data tap from the shift register 21. The PCM information INF then would correspond to the input information to the line synchronizer system 10 as taken from one of the phase shift delay taps, and would appear as the waveforms DT4, DT3, DT2 and DT1 of FIG. 6.

Figure 6:
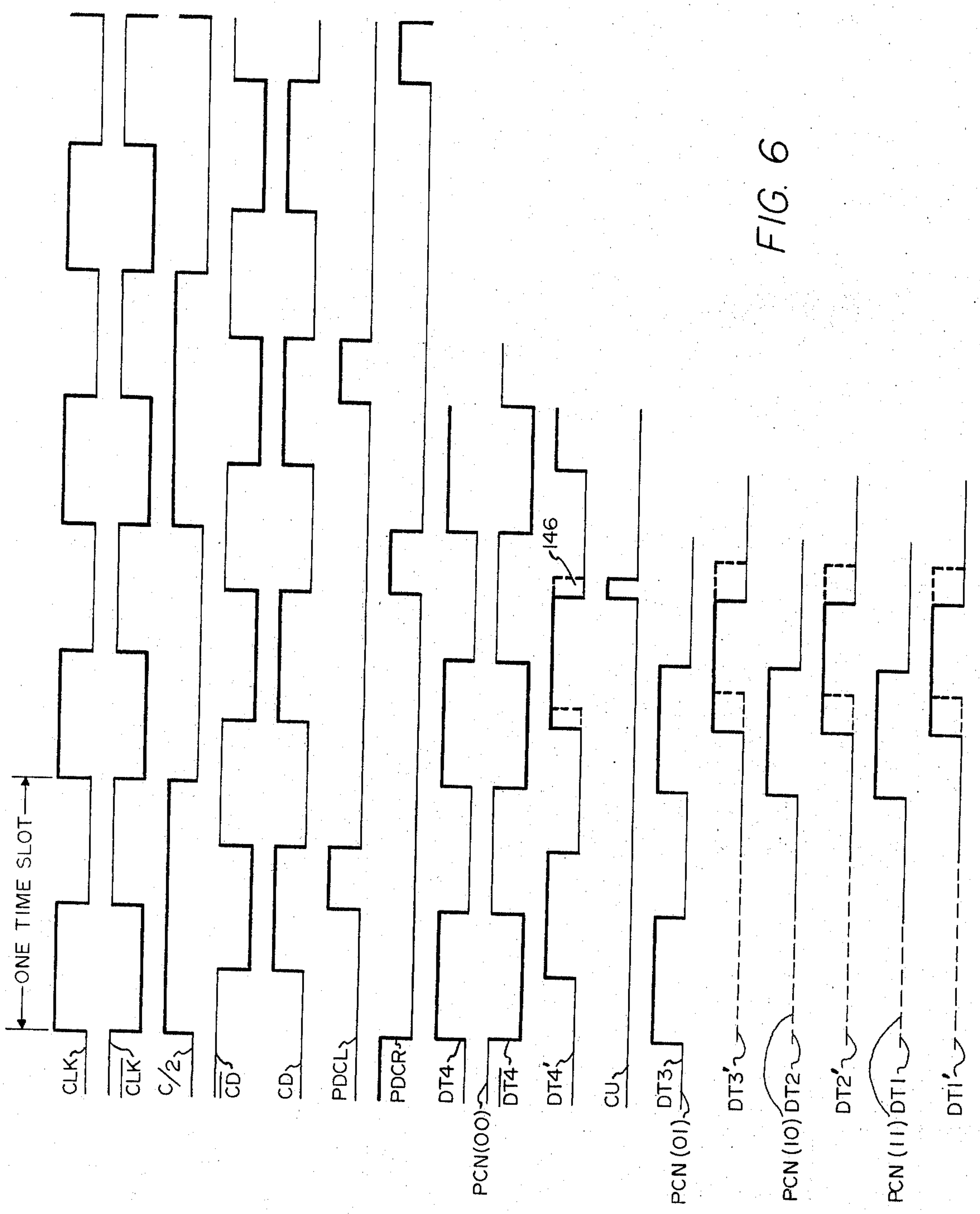
FIG. 6 is a graphical representation with respect to time of certain information signals used within the digital phase detector subsystem.

FIG. 5A shows the portion of the logic circuitry for the phase detector logic 23 which derives the exchange reference timing by which a phase shift in the positive or negative direction is determined. The master exchange clock frequency, the periodic waveform being shown at CLK in FIG. 6, is inputted at 121 to a logic inverter gate 123 and a toggle flip-flop circuit 125. The inverted output waveform $\overline{\text{CLK}}$ (FIG. 6) from the inverter gate 123 is processed by a 90° phase shift delay element 127 and the resulting waveform CD is also shown in FIG. 6 as is the inverted waveform $\overline{\text{CD}}$ obtained from another ensuing logic inverter gate 129. The toggle flip-flop circuit 125 is effective to divide by two the timing of the master clock frequency CLK, thus giving the resulting output waveforms C/2 and $\overline{\text{C/2}}$ at its two output terminals. The waveform for C/2 is also shown in FIG. 6. A 3-input NAND gate 131 is provided with the input waveforms C/2, $\overline{\text{CD}}$ and CLK and the resulting waveform inverted by logic inverter gate 133 to produce a periodic waveform PDCL shown in FIG. 6. The waveform PDCL is termed phase detector clock left and is particularly useful for detecting a phase shift in the PCM information INF in a negative direction, i.e., to the left in FIGS. 3 and 6. Similarly, another 3-input NAND logic gate 137 is provided with the input waveforms $\overline{\text{C/2}}$, CD and $\overline{\text{CLK}}$ and the resulting waveform inverted by logic inverter gate 139 to produce a waveform shown at PDCR in FIG. 6. As is suggested by the abbreviation used, the waveform PDCR is then termed phase detector clock right and is used to detect a phase shift in the PCM information INF in a positive (right) direction in FIGS. 3 and 6. It is to be noted that the waveforms PDCL and PDCR appear alternately in order to separately test for phase shifts in the separate directions.

The PCM information INF waveform taken from the normal data tap DT4 going positive in the φ1 phase region is depicted in FIG. 6 at DT4. The DT4 INF and the PDCR waveforms are then processed through cascaded inverter gates 141 and 143 and then a 90° time delay is introduced by a delay element 145 to provide the waveform DT4′ of FIG. 6. It can be seen with reference to the DT4′ waveform of FIG. 6, that a phase shift to the right, as indicated at 146, will be detected through use of the phase detector clock right PDCR waveform. The delay circuit 145 is designed to be triggered from the trailing edge of the DT4′ waveform.

Now the information waveforms DT4′ and $\overline{\text{INF}}$ ($\overline{\text{DT4}}$ when the data tap DT4 is being sampled) are provided as inputs to a 3-input NAND logic gate 147. The third input at 148 can be left open and ineffective or be provided with a permanent enabling signal. In either case, the resulting output of the NAND gate 147 is dependent only upon the values of the DT4′ and $\overline{\text{INF}}$ waveforms. For example, if the waveform DT4′ shifts to the right at 146 because of a positive phase shift, the waveform is thus positive when the $\overline{\text{DT4}}$ and the PDCR pulses are positive. The result is that an output signal termed a count-up CU signal or pulse is derived from the NAND gate 147, and as shown in FIG. 6, the positive duration of the CU pulse is equal to the magnitude of the positive phase shift. Referring to the waveforms of FIG. 6, it is apparent that there are four PDCL and four PDCR pulses occurring in each channel of the 24 channel frame period. One obvious variation to providing the enabling pulse on lead line 148 every 650 ns is to provide such enabling pulse only once during a selected channel at a time corresponding to one out of the four PDCR pulses, the result being the same, namely, at least one CU pulse is generated per frame period. The count-up CU pulse is used to set a set-reset S/RS flip-flop circuit 149 which provides an input to the phase control counter 25.

It is readily seen in FIG. 6 that the trailing edge of the waveform DT4′ is used to trigger a CU pulse. The leading edge of the waveform resulting from combining INF and PDCL is used to trigger a count-down CD pulse from a 3-input NAND logic gate 157. Any phase shift to the left is sought to be detected through use of the PDCL waveform. Again assuming that the data tap DT4 is in use, the DT4 INF waveform and the PDCL waveforms are processed by cascaded logic inverter gates 151 and 153 and an appropriate time delay is introduced by a delay element 155 to provide a resulting waveform DT4″ (not shown) that has its leading edge coinciding with the occurrence of the trailing edge of the PDCL positive cycles. When the three inputs to the NAND gate 157 are positive or true inputs, the count-down CD pulse is generated and supplied to a set-reset S/RS flip-flop circuit 159 which in turn is set to provide a positive signal to logic circuitry 160 of FIG. 5.

Now considering more particularly FIG. 5, a lead line 161 is shown which is enabled once during each 193rd bit position of some 650 ns duration. If there is already a positive or true signal at either one of two logic inverter gates 162 and 164 as derived from a CU and a CD pulse, respectively, then the gates 162 or 164 selectively provided a not true result which is inverted once again by a cascaded logic inverter NOR gate 166 to a true signal for the phase counter 25. Thereafter, a reset signal is given during the framing bit to the flip-flops 149 and 159 over lead line 168 whereby these flip-flops are returned to a state of readiness to recognize CU or CD pulses, respectively, in subsequent frame periods.

When there is a CU pulse outputted from the S/RS flip-flop 149, the input line 171 to the phase counter 25 is true and one of the inputs to the inverter gate 162 is true. Now when the framing bit of the frame period occurs, a true signal is supplied to the other input to the inverter gate 162, resulting in a true signal to the phase counter 25 on lead line 173. The phase counter 25 counts up by one count. If the phase counter 25 counts up (advances) for four frame periods without a count down, a course change in the positive direction is given at output 175 to the frame detector 30 and elastic buffer register 40. When there is a CD pulse given from the S/RS flip-flop 159, the 2-input NAND gate 164 is provided with one true input. Another true signal is supplied to the other input of the NAND gate 164 during the framing bit, and a true signal is given to the phase counter 25 over the input line 173. The phase counter 25 responds to the true signal at this input by counting down because the logic condition of input line 171 is zero (reducing the previously recorded count). If the phase counter 25 counts down by four counts as accumulated for continuous frame periods, a coarse change in the negative direction is given at output 177 to the frame detector 30 and elastic buffer register 40.

The phase control counter 25 is provided with four counter outputs shown at C0, C1, C2 and C3 in FIG. 5. The counter outputs C2 and C3 represent the two most significant binary bits and these bits are supplied as inputs to a decoder unit 60 illustrated in FIG. 5B. The decoder unit 69 includes two input logic gates 181 and 183 and four output logic gates 182, 184, 186 and 188. The binary outputs of the decoder unit 60 are phase count PCN00 from the logic gate 182 wherein both phase counter outputs C2 and C3 are binary zero or not true; PCN01 from the logic gate 184 wherein the phase counter output C2 is binary zero and the phase counter output C3 is true or binary one; PCN10 from the logic gate 186 wherein the reverse situation exists, namely, C2 is binary one and C3 is binary zero; and PCN11 from the logic gate 188 corresponding to binary one for both C2 and C3. There is shown in FIG. 5B, a pair of interconnection leads 185 and 187 which are used with both C2 and C3 are binary zero and a pair of interconnection leads 191 and 193 which are active when C2 is binary zero and C3 is binary one. The other two pairs of interconnecting leads to gates 186 and 188 are not shown in FIG. 5B but are thought to be obvious from a showing of the lead pairs 185–187 and 191–193. The phase count outputs PCN00, PCN01, PCN10 and PCN11 are each supplied to the exclusive OR logic gate 105 as one input of a pair of inputs and associated with the data tap inputs DT4–DT1, respectively. As the two most significant bits C2 and C3 from the phase counter 25 change state from binary one to binary zero or vice versa, the data taps DT1–DT4 are appropriately selected by the OR logic 105, thus automatically compensating for a given phase shift due to fine line variations.

Further with reference to FIG. 6, there are shown PCM information INF waveforms supplied from the data taps DT3, DT2 and DT1. Since a change in data taps is occasioned only by a line variation phase shift which is then compensated for by switching taps on the delay line 21, these INF waveforms DT3, DT2 and DT1 are all shown in FIG. 6 in phase alignment with the INF waveform DT4. The waveforms DT3, DT2 and DT1, as they are delayed by the delay line 145, are shown at DT3′, DT2′ and DT1′. It is apparent that a positive directional shift of the trailing edge of any of these delayed INF waveforms is effective to trigger a CU pulse from the 3-input NAND gate 147 in the same manner as previously explained for the INF wave form DT4′. Similarly, a negative directional shift of the leading edge of the DT3, DT2 and DT1 waveforms are used to detect and generate CD pulses from the NAND gate 157.

Figures 7, 8:
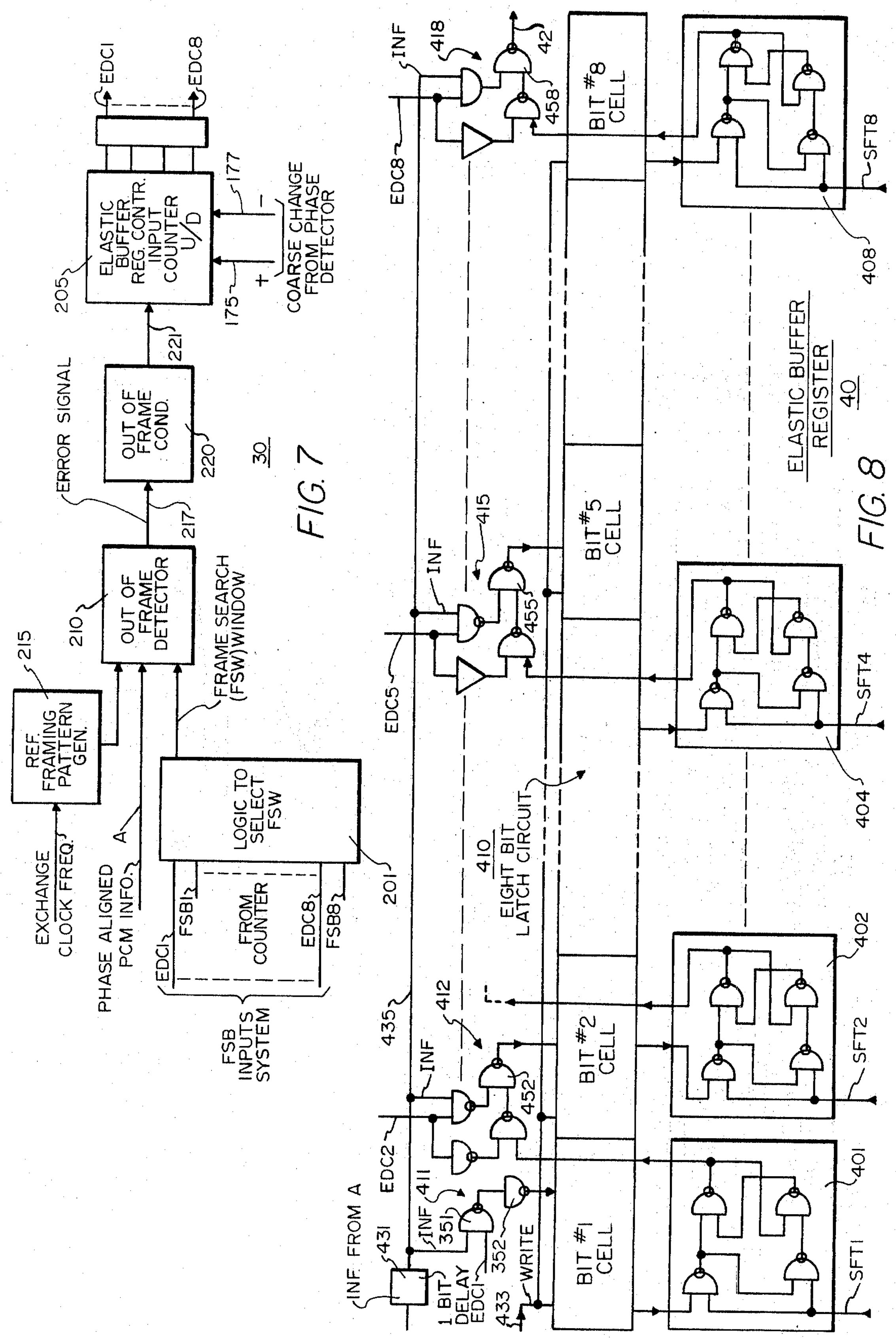
FIG. 7 is a functional block diagram of the frame detector subsystem.
FIG. 8 is partially a functional block diagram and a logic diagram of the elastic buffer register subsystem.

FIG. 7 is the functional block diagram for the frame detector subsystem 30 which is similar in many respects to standard frame detector apparatus used in digital PCM channel bank equipment. Recall that previously it was assumed that the maximum line variation would be some eight (8) pulse positions or time slots (approximately 5.2 μs). Therefore, eight consecutively occurring pulse positions or bits are selected as a frame search window FSW. For example, assume a maximum temperature change of 25° C within 1 hour which would be a severe temperature variation. If the maximum deviation is eight pulse positions, the rate of phase shift is one pulse position for approximately every 7.5 minutes. Since in one minute there are 480,000 occurrences of frame periods, it can be said that the temperature change will be constant for at least two consecutive frame periods or some 250 μs. Actual temperature changes are not so severe and it is proposed by the present invention to review each of the adjacent eight pulse positions of the frame search window FSW for a total of eight consecutively occurring frame periods. During the review of the eight frame periods, the frame detector subsystem 30 determines whether the selected pulse position which is being monitored is producing the known framing pattern and hence is the sought-after framing bit.

Suitable system counting means not illustrated in the drawing controls the initial one of the eight consecutive pulse positions (bits) represented at FSB1 through FSB8 and termed frame search bit, which is then monitored for a recognition of the known framing pattern. If the frame detector subsystem 30 produces an out-of-frame error signal, there is provided a recognition that the frame search bit being monitored is not the framing bit and frame detector subsystem 30 monitors the next highest order bit instead. Also, if the frame detector subsystem 30 receives a coarse change instruction signal from the phase control counter 25, there is provided a recognition that a phase deviation at least equal to one pulse position has occurred and the adjacent bit either to the left (negative course change) or to the right (positive course change) is then monitored instead. Accordingly, the frame detector subsystem 30 is provided with a logic-to-select circuit 201 which receives as inputs the frame search bit signals FSB1 through FSB8, and also receives eight error count signals EDC1 through EDC8 derived from the corresponding count of an elastic buffer register control input counter 205 in the form of an up-down counter. The elastic buffer counter 205 is an eight bit counter which counts up when it receives an out-of-frame signal along lead 221, and which counts up and down when it receives a positive and negative course change along leads 175 and 177, respectively.

The logic-to-select FSW circuit 201 is arranged to receive the inputs FSB1–FSB8 and EDC1–EDC8 as related pairs of inputs which input pairs are exclusive of each other. In other words, by means of advancing the elastic buffer counter, the particular FSB input which is to be monitored is controlled. The logic circuit 201 provides an output logic signal identified as the frame search window FSW to an out-of-frame detector circuit 210.

As shown in FIG. 7, the out-of-frame detector 210 also receives phase aligned PCM information from A of FIG. 5, i.e., the output of the S/RS flip-flop 109 of the phase detector subsystem 20. Also, the out-of-frame detector 210 receives a generated reference timing pattern derived from the exchange cock oscillator as shown by a reference framing pattern generator circuit 215. Fundamentally, the out-of-frame detector 210 is a comparator circuit which compares two inputs during FSW to determine any phase misalignment. The determination of phase misalignment results in an error signal 217 outputted to an out-of-frame conditioner circuit 220 which after accumulating the desired number of mismatched errors (greater than the built-in threshold) gives the corresponding output pulse along lead 221 to the elastic buffer control counter 205. The elastic buffer counter 205 advances by one count to the next highest order error count EDC, resulting in the selection of another input pair EDC-FSB by the logic circuit represented at 201. The change of count of the elastic buffer counter 205 is done only during framing time order to avoid any loss of information and potential out-of-frame condition.

Figure 9:
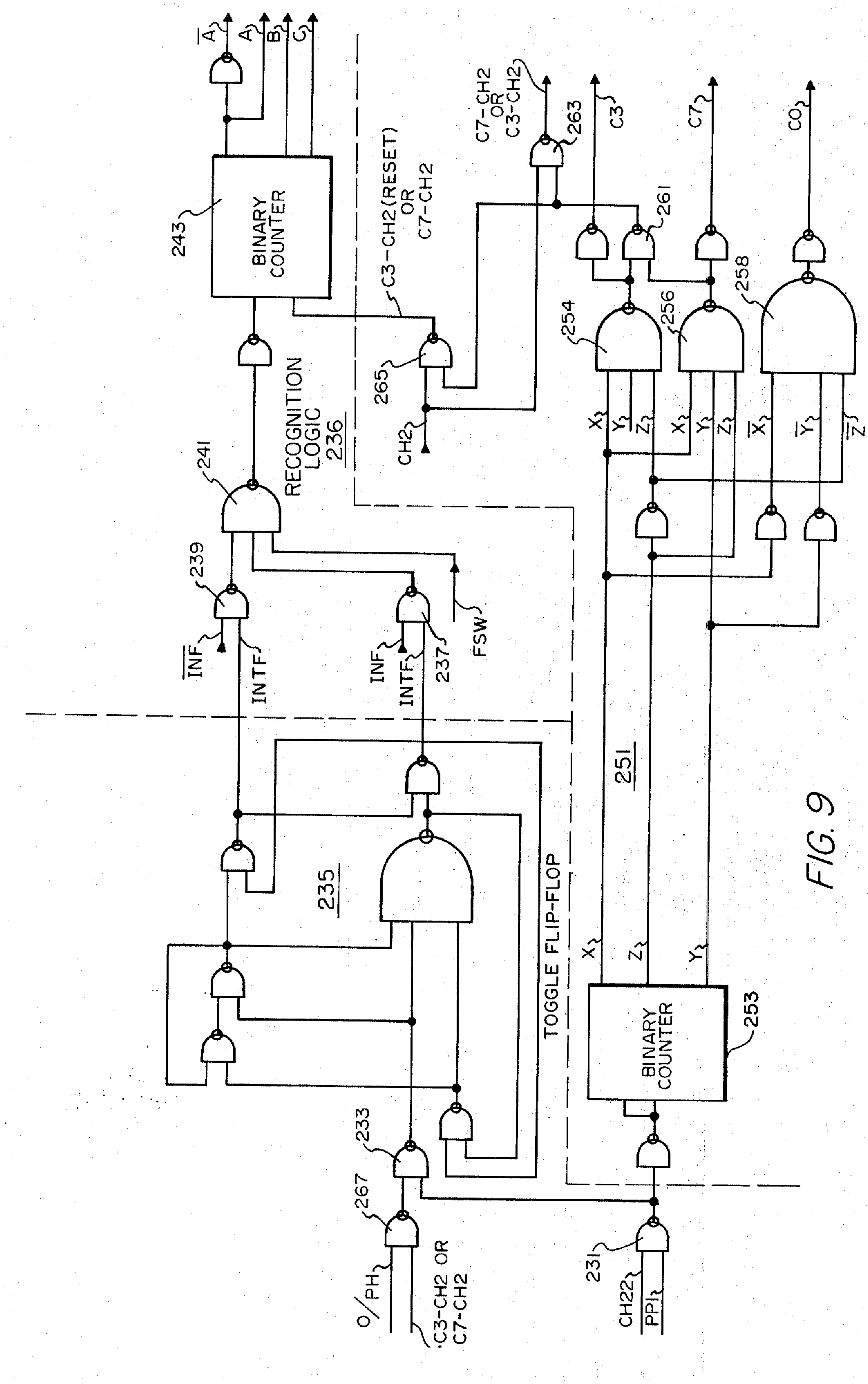
FIG. 9 is a logic diagram showing the development of logic signals within the frame detector subsystem including a portion of a reference framing pattern generator circuit and an out-of-frame detector circuit.

FIG. 9 shows the logic circuitry comprising the reference framing pattern generator 215. A logic gate 231 in the form of a two-input NAND gate receives inputs identified as CH22 (channel 22 of the 24-channel format) and PP1 (pulse position 1 of channel 22). This selection of enabling inputs to the reference framing pattern generator circuit 215 is merely selected at a position in the PCM pulse data train 12 well in advance of the particular frame search bit to be monitored. When the exchange clock reference frequency is monitored for the occurrence of both CH22 and PP1, there is provided a true output from a NOR logic gate 233 to a toggle flip-flop 235 earlier shown generally at 125. The two outputs from the toggle flip-flop 235 are shown at INTF and $\overline{\text{INTF}}$ and represent binary information from the toggle flip-flop 235 (1010 framing pattern) to be compared to the binary information of the frame search bit to be monitored within the PCM pulse data train 12. Accordingly, the toggle flip-flop circuit 235 is followed by recognition logic circuitry 236 comprising a pair of 2-input NAND logic gates 237 and 239 for detecting a mismatch of binary information between the two inputs INTF and INF and $\overline{\text{INTF}}$ and $\overline{\text{INF}}$, respectively, and further comprising a 3-input NAND logic gate 238 for detecting such a mismatch upon the occurrence of the frame search window FSW signal from the logic-to-select FSW circuit 201. The recognition logic circuitry 236 comprises a part of the out-of-frame detector circuit 210 and includes a standard binary counter 243 having three binary outputs A, B and C for recording each and every phase mismatch ultimately detected by logic gate 241. The logic gate 241 is to be enabled by three binary one inputs. Hence, for the logic gates 237 and 239 to provide a binary one output, there must be a binary mismatch of the pairs of inputs INTF-INF and $\overline{\text{INTF}}$ - $\overline{\text{INF}}$. Thereby, the frame detector subsystem 30 is provided the capability to determine an error condition and provide an error signal 217.

Figure 10:
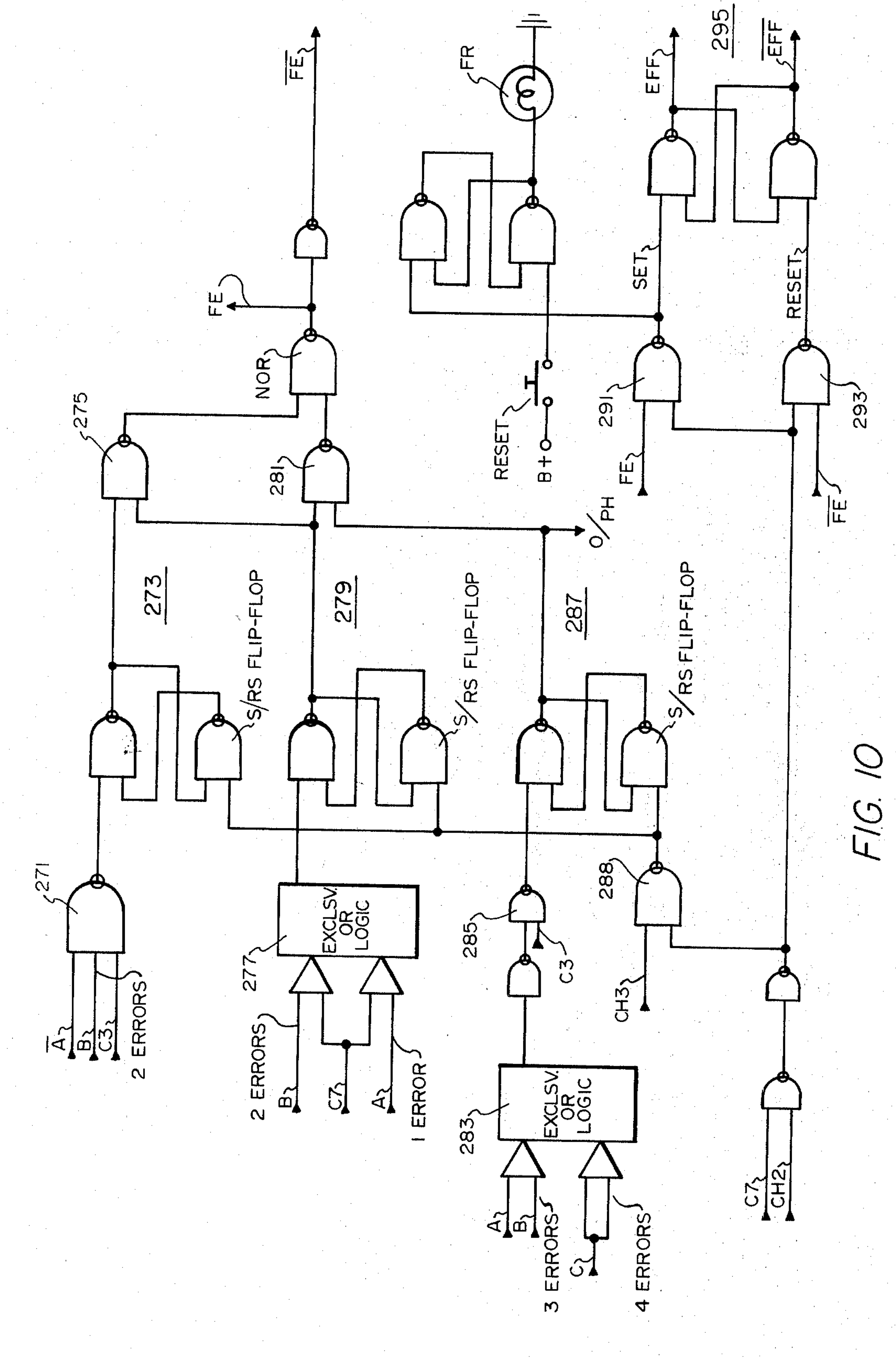
FIG. 10 is another logic diagram further illustrating the out-of-frame detector circuit of the frame detector subsystem.

FIG. 9 shows at 251 the proper timing circuitry to co-Ordinate the recording of the error signals by the binary counter 243 with the number of consecutive occurrences of the particular frame search bit FSB being monitored within the frame search window FSW. Another standard binary counter at 253 having three binary outputs X, Y and Z is provided for recording each occurrence of the selected frame search bit FSB. The binary counter 253 is first enabled by the logic gate 231 at the same time that the toggle flip-flop 235 is enabled thereby. Each successive occurrence of CH22, PP1 within the repeating frame period format triggers the binary counter 253 and it advances its count from count one CO (all binary zero condition) through count eight C7 (all binary one condition). Of course, the system timing is such that the occurrence of CO is simultaneous with the occurrence of the first of eight consecutive frame periods for the monitoring of a selected one of the eight possible frame search bits FSB within the frame search window FSW. Three 3-input NAND logic gates 254, 256 and 258 are used to provide recognitions of the first C0, fourth C3 and eighth C7 counter registrations, respectively. The counter outputs C0, C3 and C7 and the counter outputs A, B and C are used within the out-of-frame detector circuit 210 as shown in FIG. 10. Also, the counter outputs C3 and C7 are used to reset the binary counter 243 at the end of the fourth frame period and eighth frame period, respectively.

As shown in FIG. 9, a logic NOR gate 261 is activated by binary zero counts from logic gates 254 and 256 and provides a binary one output (C3) to logic NAND gates 263 and 265. An input binary one signal representative of the occurrence of CH2 marking the end of the frame search window, is provided to both the logic gates 263 and 265. The output signal from the logic gates 263 and 265 is the same since the inputs are the same and the output signal is termed C3-CH2 for count four-channel two. Of course, the output could as well be termed C7-CH2 since it is the intended purpose to reset the binary counter 243 after four of its eight possible counts have occurred. The two identical logic gates 263 and 265 are provided for convenience only and a single logic gate for deriving a C3-CH2 signal could be used instead. The output of the logic gate 263 is provided to a logic NAND gate 267 which in turn provides an output to the logic NOR gate 233 used to toggle the flip-flop circuit 235. As stated, the output C3-CH2 of the logic gate 265 is used to reset the binary counter 243, but the output C3-CH2 to the logic gate 267 comprises only one of the required enabling signals to the logic gate 267. The other enabling logic signal is termed O/PH for out-of-phase condition and enables the logic gate 267 to trigger the toggle flip-flop 235 so as to reverse the triggering pattern being provided by the logic gate 233 for a purpose to be set forth more clearly hereinafter.

In accordance with the principles of the present invention, the eight consecutive frame periods which are monitored are divided into two groups of four frame periods, namely, the first four frame periods F1–F4 and the final four frame periods F5–F8. If the selected frame search bit FSB is the correct framing bit, there will be no mismatches and no error signals generated. If the selected FSB is not the correct framing bit, an occasional match may occur during eight consecutive comparisons and there will be less than eight mismatches. If the selected FSB and the framing bit are merely out of phase, there will occur the full possible eight mismatches. Therefore, it is convenient to provide a recognition of the following error conditions, namely, two mismatches within the first four frame periods, either one or two mismatches within the final four frame periods, and either three or four mismatches within the first four frame periods. The first-named error condition is used to provide a first error signal; the second-named alternative error conditions are used to derive a second error signal; and the third-named alternative error conditions are used to provide an out-of-phase error signal. The occurrence of both the first and second error signals is used to derive a final error FF signal, or alternatively, the occurrence of both the second error signal and the out-of-phase error signal will result in a final error FE signal.

FIG. 10 shows the required logic circuitry for accomplishing the generation of the final error FE signals from the counts of the two binary counters 243 and 253. Briefly, it can be readily appreciated that the specified logic conditions for enabling a logic NAND gate 271 are exactly two mismatches in the first four frame periods. The logic gate 271 is used to set a S/RS flip-flip circuit 273 which provides an enabling binary one input to a 2-input logic NAND gate 275. An exclusive OR gate 277 is arranged to respond to either one or two mismatches in the final four frame periods, and sets another S/RS flip-flop circuit 279 which provides an enabling binary one input to the logic gate 275 as well as to another 2-input logic NAND gate 281. Another exclusive OR logic gate 283 is used to respond to either three of four mismatches, the binary output signal of the gate 283 being combined by a logic NAND gate 285 with the requirement indicated at C3 that such an occurrence be within the first four frame periods. Another S/RS flip-flop circuit 287 is set and the out-of-phase O/PH signal is provided to the logic gate 267 of FIG. 9 and to the logic gate 281 of FIG. 10. The outputs of the S/RS flip-flop circuits 273 and 279 are known as the first and second error signals, respectively. During some selected channel time such as channel three CH3, after the occurrence of the final count C7 from the binary counter 253 and the occurrence of the end of frame search CH2, the logic gate 288 enables a reset signal to be given to the three S/RS flip-flops 273, 279 and 287. The final error FE signal and its counterpart $\overline{\text{FE}}$ are provided as the enabling signals to a pair of logic NAND gates 291 and 293. The logic gates 291 and 293 are used to set and reset, respectively, a S/RS flip-flop circuit 295 which provides a resulting error signal EFF to the out-of-frame condition circuit 220. An indicator light FR having a reset switch RESET may be provided if desired to visually indicate the presence of a resulting error signal.

Figure 11:
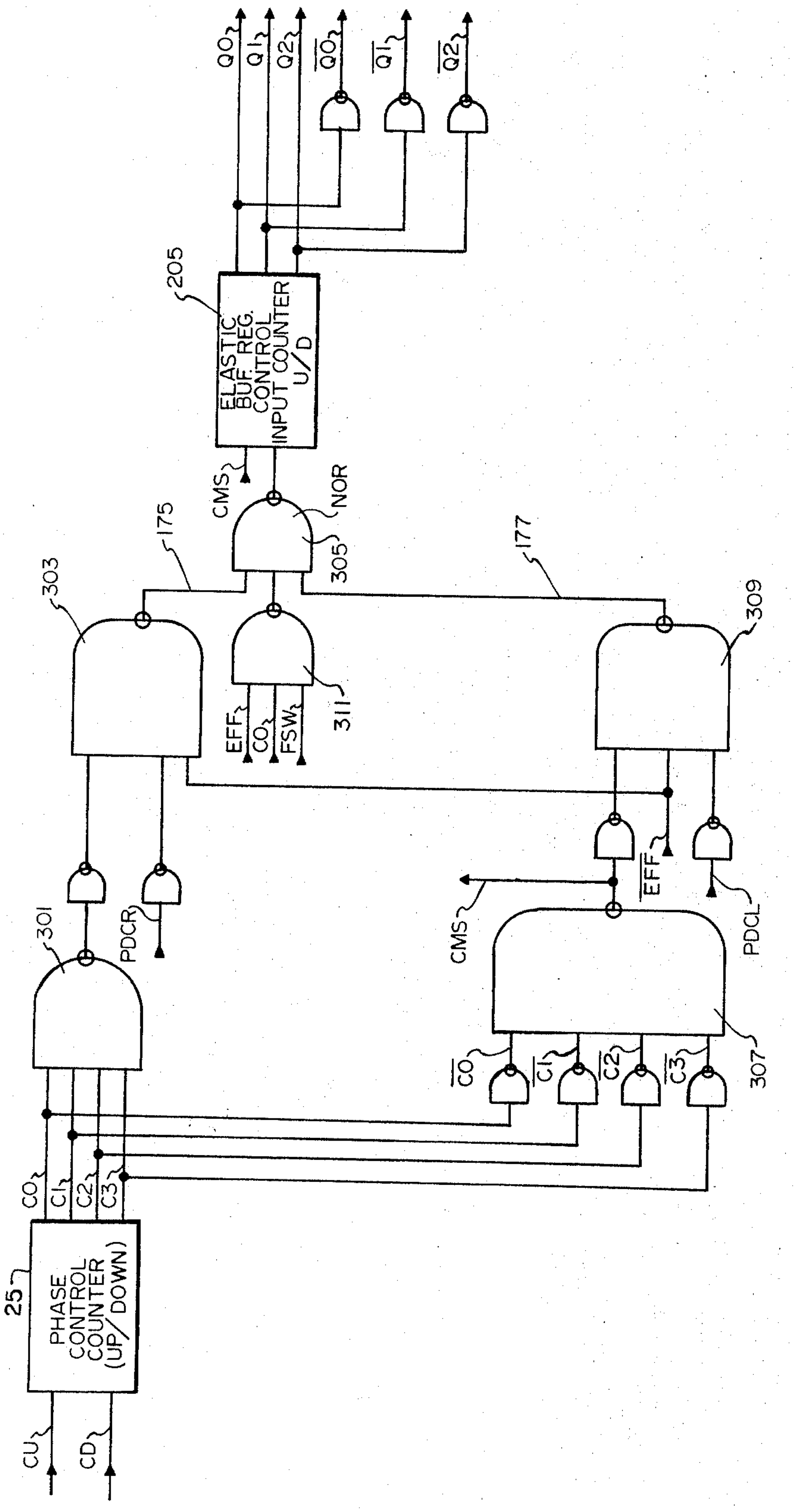
FIG. 11 is a logic diagram illustrating the development of certain timing counts to be used in a subsequent logic diagram preceding the elastic buffer register subsystem.

FIG. 11 shows the manner in which the course changes of time slots are developed from the phase control counter 25 and supplied to the elastic buffer control input counter 205. For convenience of illustration, the coarse change leads 175 and 177 have been shown in FIG. 5 as originating with the phase control counter 25 and being supplied to the elastic buffer control counter in FIG. 7 as separately developed signals within the phase control counter 25. As shown more clearly in FIG. 11, the positive and negative course changes are developed from the four count outputs C0–C3 of the phase control counter 25. A 4-input logic NAND gate 301 receives the four counts C0–C3 and provides a positive logic signal to a 3-input logic NAND gate 303. The logic gate 303 receives two further inputs, namely, phase detector clock right PDCR and NOT logic error signal $\overline{\text{EFF}}$. The lead line 175 as formerly shown in FIGS. 5 and 7 actually connects the logic gate 303 to a 3-input logic NOR gate 305 which is enabled by the positive directional coarse change over 175 to cause the elastic buffer control counter 205 to advance its count. The elastic buffer counter 205 is placed in a bi-directional count mode by a count mode selector input CMS derived from another 4-input logic NAND gate 307. A 3-input logic NAND gate 309 is enabled by the inputs CMS, $\overline{\text{EFF}}$ and PDCL to provide a negative directional coarse change over the lead line 177 to the NOR gate 305 whereupon the elastic buffer counter 205 reduces its count. The outputs EFF, C0 and FSW are used to enable a 3-input logic NAND gate 311 which will also provide an enabling output to the NOR logic gate 305 for advancing the count of the elastic buffer counter 205. It is to be noted that when the NOR logic gate is enabled by the output from the NAND gate 311, the elastic buffer counter 205 can only advance its count.

Figure 12:
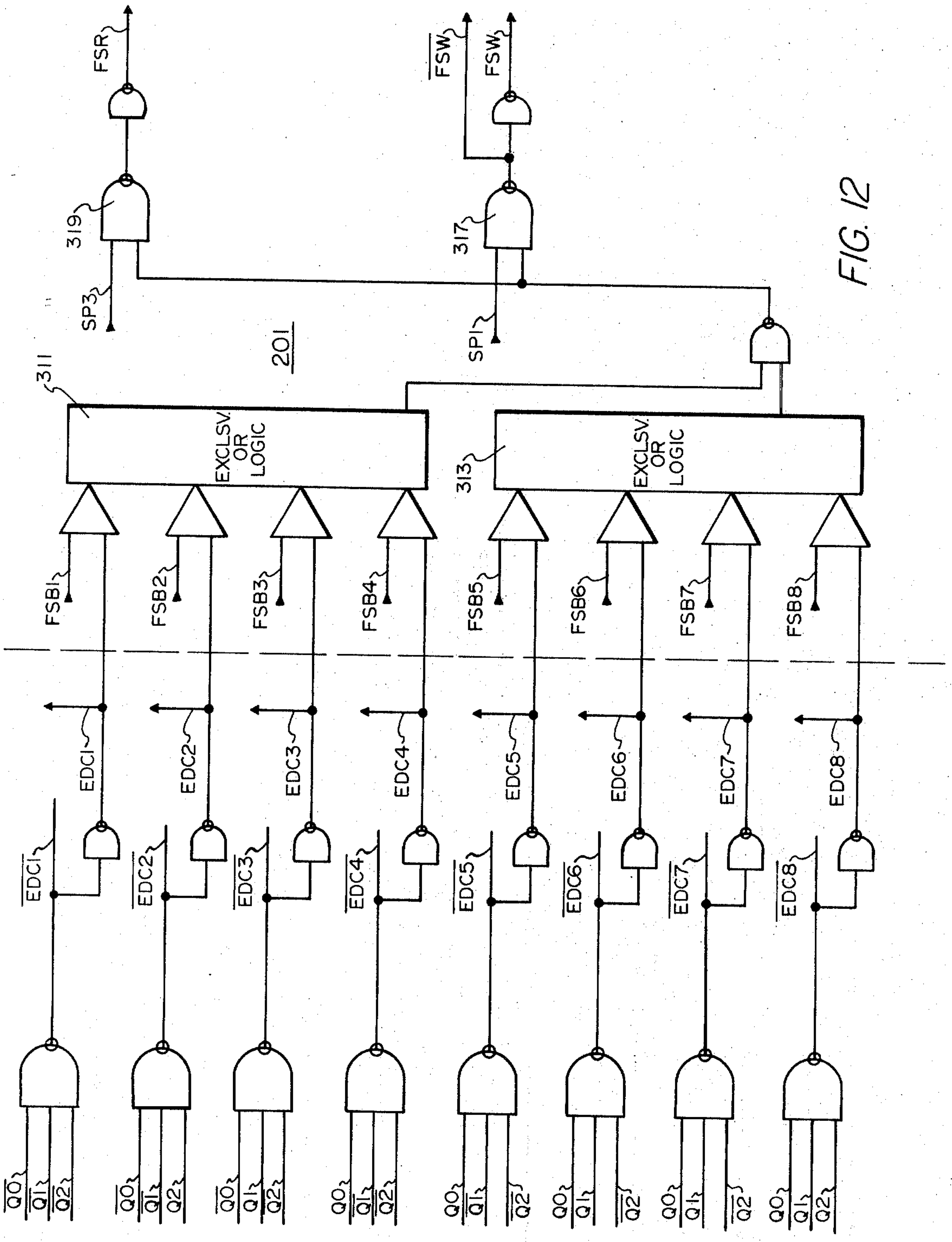
FIG. 12 is a logic diagram of the aforementioned subsequent logic diagram which develops timing input signals which control the gating of write circuits within the elastic buffer register subsystem.

The output counts Q0–Q2 from the elastic buffer counter 205 are used to develop the discriminating inputs of error detector counts EDC1–EDC8 and their NOT logic complements $\overline{\text{EDC1}}$ – $\overline{\text{EDC8}}$ as shown in FIG. 12. The logic-to-select FSW circuit 201 of FIG. 7 is primarily comprised of two 4-input exclusive OR logic gates 313 and 315. The combined output signal from these two logic gates 313 and 315 is provided to the two logic NAND gates 317 and 319 which are then enabled upon receiving incoming timing reference pulses SP1 and SP3. The timing reference pulses SP1 and SP3 are not shown developed on the drawing but are supplied from common control equipment logic just prior to the occurrence of frame search time.

Figure 13:
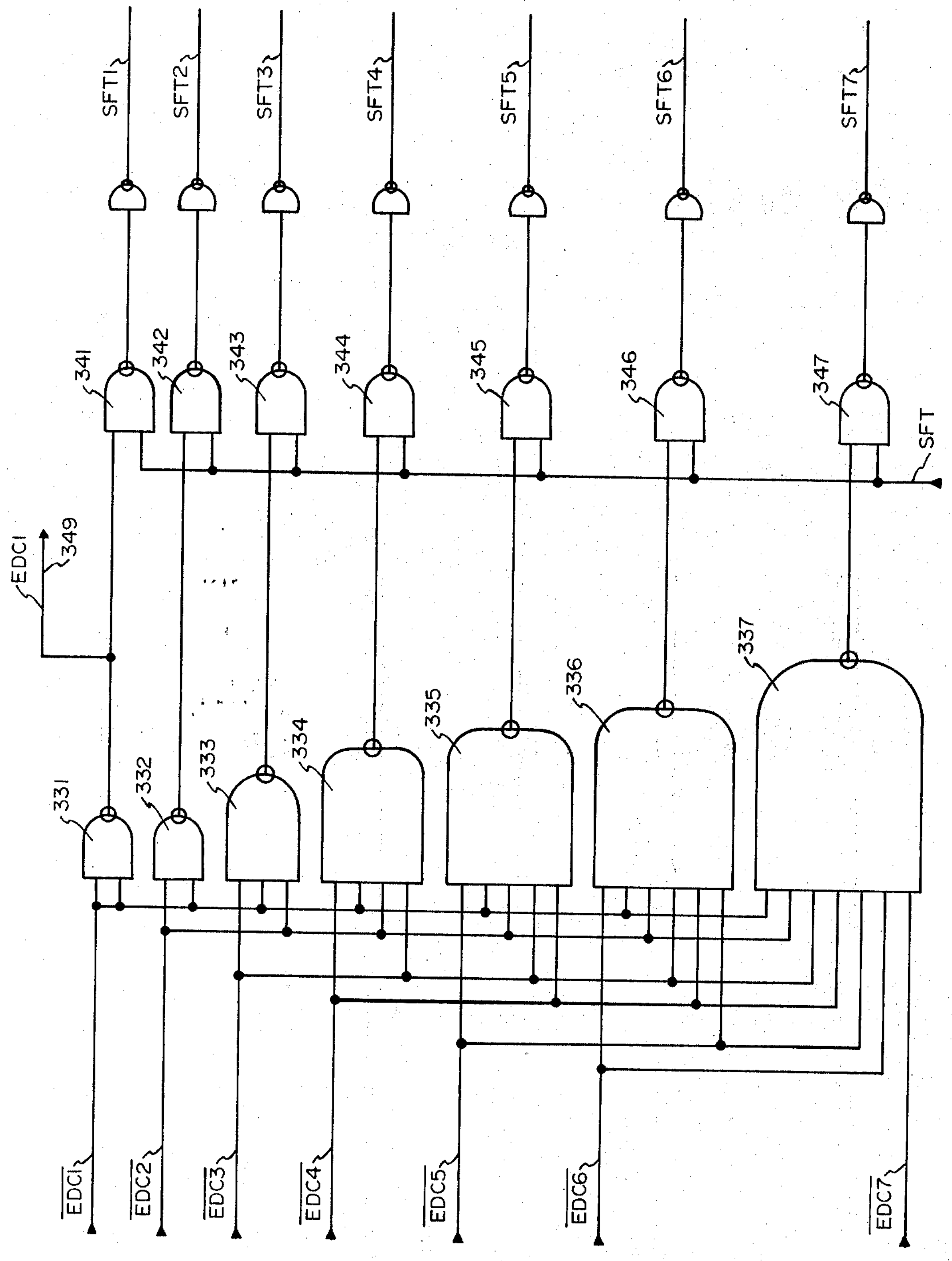
FIG. 13 is a logic diagram showing the development of another set of timing input signals useful within the elastic buffer register subsystem.

FIG. 13 shows the development of seven shift timing signals SFT1–SFT7 from the NOT logic $\overline{\text{EDC1}}$ – $\overline{\text{EDC7}}$ to be used in the elastic buffer register subsystem 40 of FIG. 8. The logic NAND gates shown at 331–337 are arranged to provide the enablement of all higher order numbered logic gates 331–337 when a selected error detector counter $\overline{\text{EDC1}}$ – $\overline{\text{EDC7}}$ has been provided from the existing count of the elastic buffer counter 205. The shift timing pulses SFT1–SFT7 are only provided subsequent to the occurrence of a basic shift timing signal SFT supplied to logic NAND gates 341–347, which signal SFT is provided from the common control equipment logic of the switching exchange as were the timing signals SP1 and SP3. As shown at 349 in FIGS. 13 and 8, the output EDC1 of the first logic gate 331 is connected to logic circuits 351 and 352 which provide an input to the first of eight separate buffer stores or cells B1T1–B1T8 of the elastic buffer register subsystem 40.

The elastic buffer register subsystem 40 of FIG. 8 is comprised of shift circuits 401–408 for receiving the shift timing signals SFT1–SFT8, respectively, a eight bit latch circuit 410 including the buffer stores B1T1–B1T8 and write circuits 411–418 for writing incoming PC, information INF into the buffer stores B1T1–B1T8. FIG. 8 shows only the shift circuits 401, 402, 404 and 408, the buffer stores B1T1, B1T2, B1T5 and B1T8, and the write circuits 411, 412, 415 and 418, since the omitted portions are merely identical to the circuits shown and are not required to enable a full understanding of the operation of the elastic buffer register subsystem 40. Now in accordance with its operation the elastic buffer register 40 receives PCM information INF from the output A of the phase detector subsystem 30 and there is incurred a one-time slot delay in a one-bit delay line 431. The one-bit delay is required in order to allow the recognition of the start of the frame search window before writing of information INF is begun. A write pulse at 433 is received by all the buffer stores to enable the same to store the incoming PCM INF from source A on lead line 435.

Any incoming PCM information INF stored in B1T1 would be transferred to the shift circuit 401 at a time when the shift timing signal SFT1 occurred prior to the occurrence of the next information bit. Upon the occurrence of the next information bit, the PCM information INF stored in the shift circuit 401 is transferred to the buffer store B1T2 through enabling its associated write circuit 412. B1T1 receives the PCM information INF from the next information bit. Because of the one bit delay line 431, the write process always lags the real time occurrence of the received PCM information 12 by approximately 650 ns. The described shifting process repeats itself in an obvious manner until a given sample of PCM information INF has been shifted from the buffer store latch circuit 410 into which it was first written through the eighth buffer store B1T8.

It is to be noted that the write circuit 411 is comprised of solely the two logic gates 351 and 352 for the reason that it is not required that the first buffer store B1T1 ever receive PCM information samples from a preceding shift circuit. The write circuits 412–418 are identical and receive inputs EDC, SFT and INF whereupon internal logic NOR gates 452–458, respectively, are enabled by either EDC alone or EDC plus SFT inputs to write PCM information INF into the associated buffer store. As previously stated, the maximum delay of the line synchronizer system 10 has been designed for eight pulse positions and hence the eight buffer stores of the eight bit latch circuit 410 are provided. However, it is apparent that less than the maximum amount of phase correction will be required in most instances. The phase detector subsytem 20 has been described in its manner of correcting for fine line variations of less than one complete pulse position, and the circuit arrangement of the elastic buffer register 40 shows that only coarse line variations in terms of full pulse positions are processed. Accordingly, the particular error detector count EDC that is generated by the logic circuit of FIG. 12 determines the amount of time delay (the number of buffer stores) which is provided by the elastic buffer register 40.

FIG. 13 shows the circuit provision whereupon the input of a particular EDC lead is provided to its associated input logic gate and all other logic gates for higher order numbered EDC leads but not to the logic gates associated with any lower order numbered EDC leads. This is for the enablement of the shifting function wheeby PCM information INF can be shifted into each higher order numbered buffer store until the PCM information INF has cleared the elastic buffer register subsystem 40. For example, if EDC5 input signal was provided by the logic circuit of FIG. 12 to the write circuit 415, PCM information INF would be written into the buffer store B1T5. The previously written PCM INF which had been transferred to the associated shift circuit 405 is now written into buffer store B1T6 while the shift circuits 406, 407 and 408 write their stored information into the buffer stores B1T7, B1T8 and transfer out over the output lead line 42, respectively. The change in bit positions due to a change of EDC leads, i.e., shifting between buffer stores, is done only during framing time since framing time is not used for switching of the PCM information INF and the framing bit can be regenerated by other equipment external to the line synchronizer system 10.

It is to be understood that while the present invention has been shown and described with reference to the preferred embodiment thereof, the invention is not to be limited to the precise circuits and logic arrangements set forth, and that various modifications and changes may be made by those skilled in the art without departing from the spirit and scope thereof.

What is claimed is:

1. A line synchronizer system for use with a digital PCM communication switching network receiving thereto a frequency synchronized digital PCM carrier pulse data train to be switched, said PCM pulse train arranged in a cyclic time frame format of repeating frame periods and having sporadically occurring phase misalignments due to line variation phenomena, said line synchronizer system comprising a digital phase detector subsystem repeatedly detecting said phase misalignment, said phase detector subsystem including first time delay means recieving said P.C.M. data train for compensating for said phase misalignments of less than one full pulse period and further including first logic means connected to said first time delay means for providing first and second output signals of opposite polarity corresponding to phase misalignments of at least one full pulse period in positive and negative directions, respectively, a frame detector subsystem including means for generating a first cyclic timing pattern, detector means for receiving said P.C.M. pulse train and detecting misalignments of said P.C.M. pulse train with said reference timing pattern during each of a plurality of repeating time periods, said detector means providing an error signal in response to a predetermined number of said phase misalignments, first counter means including means for advancing the state thereof when either of said first output signal from said first logic means or said error signal occurs and means for regressing the state of said first counter means when said second output signal from said first logic means occurs, and an elastic buffer register store subsystem including second time delay means being connected to said first counter means and connected for receiving said P.C.M. pulse train, said second time delay means selectively imparting to said PCM pulse train a predetermined number of time delay periods equal to an integral multiple of the frame period of said PCM pulse train, said predetermined number of time delay periods being correspondingly increased with said count state advances of and correspondingly decreased with said count state regressions of said first counter means, respectively, first gating means connecting said PCM pulses to said second time delay means, and second gating means connected to said second time delay means for activating the transfer of said PCM pulses within said second time delay means prior to a subsequent operation of said first gating means.

2. A line synchronizer system as claimed in claim 1 wherein said first time delay means of said phase detector subsystem receives said PCM pulse train and includes a plurality of access output data taps for providing therefrom said PCM pulse train having preselected magnitudes of time delays, respectively, only one of said access output data taps being utilized at any given time, and said first logic means includes detector means for detecting said phase misalignments in said positive and negative directions, second counter means for counting cumulatively said positive and negative directional phase misalignments which occur within a framing bit period for said PCM pulse train, respectively, means for changing said access output data taps in a first direction corresponding to said counted positive directional phase misalignments, respectively, and in a second direction corresponding to said counted negative directional phase misalignments, respectively, for varying said preselected magnitude of time delay, said first output signal from said first logic means occurring for a preselected number of cumulative changes of said access output data taps in said first direction and said negative output signal thereof occurring for a corresponding preselected number of cumulative changes of said access output data taps in said second direction.

3. A line synchronizer system as claimed in claim 2 wherein said first time delay means is a three bit cell shift register having four access output data taps arranged with respect to said bit cells to provide 0°, 90°, 180° and 270° phase delays at said four access output data taps, respectively, out of 360° phase delay corresponding to one full pulse period.

4. A line synchronizer system as claimed in claim 1 wherein said PCM pulse train is arranged in a cyclic time frame format having repeating frame periods and said comparing means of said frame detector subsystem is active within a preselected number of pulse periods within each of said frame periods.

5. A line synchronizer system as claimed in claim 4 wherein said preselected number of pulse periods are adjacent and continuously occurring pulse periods and constitute a frame search window.

6. A line synchronizer system as claimed in claim 4 wherein said second time delay means of said elastic buffer register store subsystem comprises a shift register having bit cells providing cumulative time delays and corresponding in number to said preselected number of pulse periods within each of said frame period for which said comparing means of said frame detector subsystem is active, each of said bit cells providing a time delay of substantially one pulse period, said first gating means comprises a plurality of write circuits associated correspondingly with the inputs of said bit cells for writing said PCM pulses into said bit cells, respectively, and said second gating means includes a plurality of shift circuits associated correspondingly with the inputs of said bit cells for transferring said PCM pulses from a preceding bit cell prior to the occurrence of the next succeeding PCM pulse and to said write circuit of the associated bit cell with the occurrence of said next succeeding PCM pulse, and means for selecting a first bit cell of said preselected number of bit cells in accordance with the cumulative count of said first counter means of said frame detector subsystem.

7. A line synchronizer system for use with a communication swtiching network useful for switching a synchronized digital PCM pulse data train arranged in a cyclic time frame format of repeating frame periods and having sporadically occurring bi-directional phase misalignments due to line variation phenomena, said line synchronizer system comprising: a digital phase detector subsystem including first logic means receiving said P.C M. data train for detecting said phase misalignments which occur in positive and negative directions, said first logic means providing first and second output signals corresponding to positive and negative phase misalignments of at least one pulse period, respectively, and third output signals corresponding to detected phase misalignments of less than one pulse period, first time delay means receiving said PCM pulse train and said third output signals and delaying said PCM pulse train by preselected magnitudes of time corresponding to said third output signals, a frame detector subsystem including means for generating a reference timing pattern, detector means for receiving said PCM pulse train and detecting misalignments of said PCM pulse train with said reference timing pattern during each of a plurality of repeating time periods, said detector means providing an error signal in response to a predetermined number of said phase misalignments, and an elastic buffer register store subsystem including a plurality of cumulatively arranged time delay devices, each thereof having a pair of input terminals for receiving individual PCM pulses and an output terminal for transmitting said PCM pulses with a time delay of substantially one pulse period, a corresponding plurality of first gating circuits connected to one of said input terminals of associated ones of said time delay devices, respectively, for successively writing said individual PCM pulses into said associated time delay devices, a corresponding plurality of second gating circuits connected to the other of said input terminals of said time delay devices, respectively, said second gating circuits further being connected to an immediately preceding one of said time delay devices for transferring said PCM pulses therefrom prior to the writing of the next succeeding PCM pulse and further transferring said PCM pulses to said associated time delay devices with the occurrence of said next succeeding PCM pulse, and second logic means for selecting a first time delay device of said plurality of time delay devices, said second logic means receiving thereto said first and second output signals from said digital phase detector subsystem and said error signals from said frame detector subsystem to enable said selection.

8. A line synchronizer system as claimed in claim 7 wherein said predetermined number of time delay periods is equal to an integral multiple of the frame period of said PCM pulse train, and said detector means is active within a preselected number of consecutively occurring pulse periods within each of said frame periods.

9. A line synchronizer system as claimed in claim 8 wherein said frame detector subsystem includes first counter means including means for advancing the count thereof with the occurrence of either one of said first output signals from said phase detector subsystem or said error signals and for regressing the count thereof with the occurrence of said second output signals from said pase detector subsystem, respectively, and said second logic means selects said first time delay device of said elastic buffer register subsystem in accordance with the cumulative count of said first counter means of said frame detector subsystem.

10. A time synchronizer system as claimed in claim 8 wherein said digital phase detector subsystem further includes second reference timing means for providing cyclically occurring first and second detector pulse trains having the trailing edges of the individual pulses of said first detector pulse train and the leading edges of the individual pulses of said second detector pulse train time aligned with the occurrences of the leading and trailing edges of the individual pulses of said PCM pulse train, respectively, second means for detecting phase shifts of said individual PCM pulses in said positive and said negative directions through detecting simultaneous occurrences of said individual PCM pulses with the occurrences of the pulses of said second and said first pulse trains, respectively, decoder means for decreasing and increasing said preselected magnitudes of time delay with each of said positive and negative directional phase shifts, respectively, which occur within said preselected number of consecutively occurring pulse periods within each of said frame periods whereby phase misalignments of less than one full pulse period are compensated for.

11. A line synchronizer system as claimed in claim 8 wherein said detector means is active within eight consecutively occurring pulse periods within each of said repeating frame periods and said detector means provides said error signal in response to two occurrences of phase misalignments in the first four consecutively occurring frame periods, at least one occurrence of phase misalignments out of eight consecutively occurring frame periods, and at least three occurrences of phase misalignments in any four consecutively occurring frame periods out of eight frame periods.

* * * * *

UNITED STATES PATENT OFFICE

CERTIFICATE OF CORRECTION

Patent No. 3,825,683 Dated July 23, 1974

Inventor(s) Satyan G. Pitroda/Bernard J. Rekiere

It is certified that error appears in the above-identified patent and that said Letters Patent are hereby corrected as shown below:

Col. 16, line 46 "misalignment" should be -- misalignments --

Col. 16, line 65 "signal" should be -- signals --

Col. 19, line 15 "pase" should be -- phase --

Col. 19, line 20 "time" should be -- line --

Signed and sealed this 3rd day of December 1974.

(SEAL)
Attest:

McCOY M. GIBSON JR.
Attesting Officer

C. MARSHALL DANN
Commissioner of Patents